(12) United States Patent
Chilla et al.

(10) Patent No.: US 9,876,758 B2
(45) Date of Patent: Jan. 23, 2018

(54) TECHNIQUES TO PROPAGATE SIP/P-CSCF ADDRESS CHANGES FROM WAN DEVICE TO LAN CLIENTS

(71) Applicant: QUALCOMM Incorporated, San Diego, CA (US)

(72) Inventors: Rajashekar Chilla, San Diego, CA (US); Lakshmi Bhavani Garimella SriVenkata, San Diego, CA (US); Krishna Chitanya Billuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 14/158,622

(22) Filed: Jan. 17, 2014

(65) Prior Publication Data

US 2015/0207777 A1    Jul. 23, 2015

(51) Int. Cl.
| | |
|---|---|
| *H04L 29/12* | (2006.01) |
| *H04L 29/06* | (2006.01) |
| *H04W 4/00* | (2009.01) |
| *H04W 88/06* | (2009.01) |
| *H04L 29/08* | (2006.01) |

(52) U.S. Cl.
CPC ...... *H04L 61/2535* (2013.01); *H04L 61/2015* (2013.01); *H04L 61/2076* (2013.01); *H04L 67/42* (2013.01); *H04W 4/003* (2013.01); *H04W 88/06* (2013.01); *H04L 61/6013* (2013.01); *H04L 65/1083* (2013.01); *H04L 67/145* (2013.01)

(58) Field of Classification Search
CPC .......... H04L 29/08; H04L 29/12; H04L 29/06
See application file for complete search history.

(56) References Cited

U.S. PATENT DOCUMENTS

| | | | |
|---|---|---|---|
| 2004/0095962 A1* | 5/2004 | Ohta | H04L 61/1511 370/475 |
| 2008/0095160 A1* | 4/2008 | Yadav | H04L 12/1886 370/390 |
| 2008/0270580 A1* | 10/2008 | Lange | H04L 12/2856 709/220 |

(Continued)

FOREIGN PATENT DOCUMENTS

| | | |
|---|---|---|
| EP | 2028793 A1 | 2/2009 |
| WO | 0205510 A1 | 1/2002 |

OTHER PUBLICATIONS

International Search Report and Written Opinion—PCT/US2015/011588—ISA/EPO—dated Apr. 20, 2015.

(Continued)

*Primary Examiner* — Nicholas Taylor
*Assistant Examiner* — Sanjoy Roy
(74) *Attorney, Agent, or Firm* — Arent Fox LLP

(57) ABSTRACT

A method, an apparatus, and a computer program product for wireless communication are provided. The apparatus may be a user device. The apparatus determines that a network server IP address of a first network has changed. The apparatus transmits information associated with the change to one or more client devices in a second network. In an aspect, the one or more client devices in the second network are connected to the first network using the network server IP address of the first network.

25 Claims, 12 Drawing Sheets

(56) References Cited

U.S. PATENT DOCUMENTS

| | | | | |
|---|---|---|---|---|
| 2008/0310323 | A1* | 12/2008 | Shirota | H04L 29/12056 370/254 |
| 2011/0010463 | A1* | 1/2011 | Christenson | H04L 29/12066 709/245 |
| 2011/0019660 | A1* | 1/2011 | Kumarasamy | H04L 65/1059 370/352 |
| 2011/0141879 | A1* | 6/2011 | Ballard | H04L 41/06 370/217 |
| 2012/0042084 | A1* | 2/2012 | Dutta | H04L 65/1016 709/228 |
| 2013/0067084 | A1 | 3/2013 | Hershko et al. | |
| 2013/0067101 | A1 | 3/2013 | Xu et al. | |
| 2013/0117457 | A1 | 5/2013 | Allen et al. | |
| 2013/0132539 | A1 | 5/2013 | Meyer et al. | |
| 2013/0254423 | A1 | 9/2013 | George | |

OTHER PUBLICATIONS

Joens T., et al., DHCP reconfigure extension; rfc3203.txt, Dec. 1, 2001, Dec. 1, 2001 (Dec. 1, 2001), XP015008982, ISSN: 0000-0003, 8 pages.

McAuley A., "Requirements for Extending DHCP into New Environments; draft-ietf-dhc-enhance-requirements-00.txt," Mar. 8, 2000, vol. dhc, Mar. 8, 2000 (Mar. 8, 2000), XP015017039, 16 pages.

Schulzrinne H., "Dynamic Host Configuration Protocol (DHCP-for-IPv4) Option for Session Initiation Protocol (SIP) Servers; rfc3361.txt," Aug. 1, 2002, Aug. 1, 2002 (Aug. 1, 2002), XP015009120, ISSN: 0000-0003, 8 pages.

Tacsik E., "DHCP option for IPv6 SIP Proxy address; draft-tacsik-dhc-dhcp-ipv6-sip-proxy-00.txt," Feb. 26, 2004 (Feb. 26, 2004), XP015035911, ISSN: 0000-0004, 12 pages.

* cited by examiner

TECHNIQUES TO PROPAGATE SIP/P-CSCF ADDRESS CHANGES FROM WAN DEVICE TO LAN CLIENTS

BACKGROUND

Field

The present disclosure relates generally to communication systems, and more particularly, to a network user device connected to two different networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user device. The apparatus determines that a network server Internet protocol (IP) address of a first network has changed. The apparatus transmits information associated with the change to one or more client devices in a second network. In an aspect, the one or more client devices in the second network are connected to the first network using the network server IP address of the first network.

DETAILED DESCRIPTION

Figure 1:
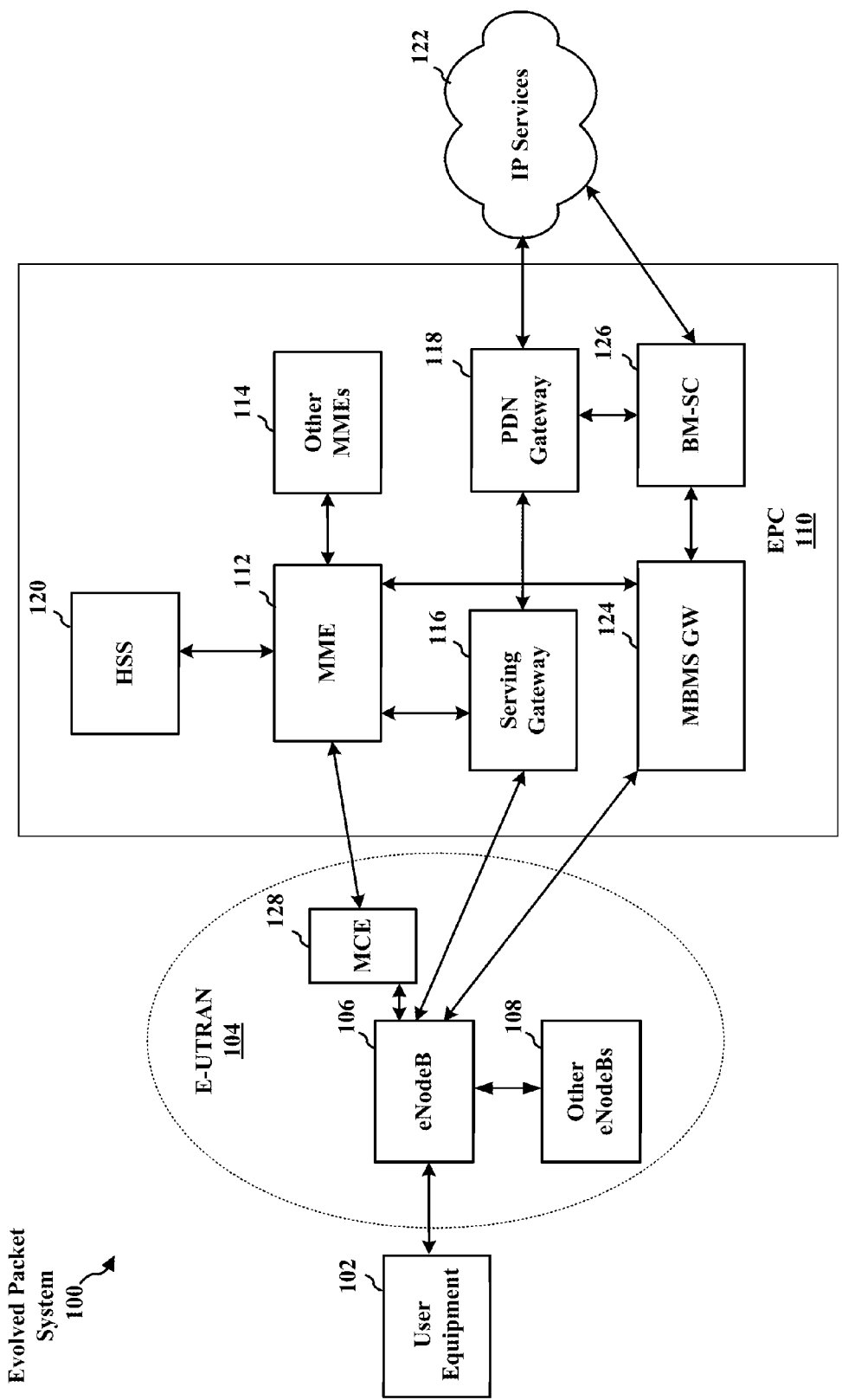
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
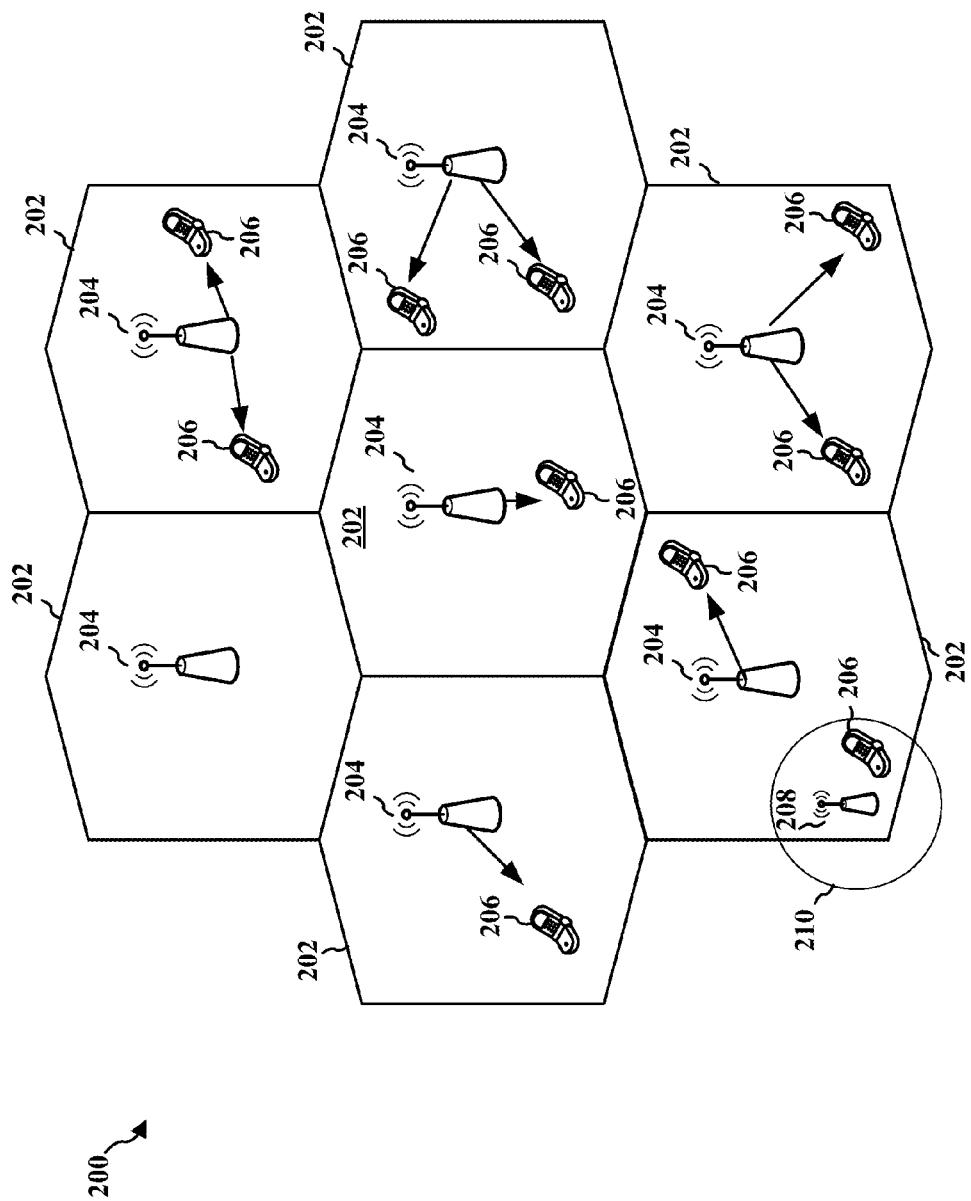
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
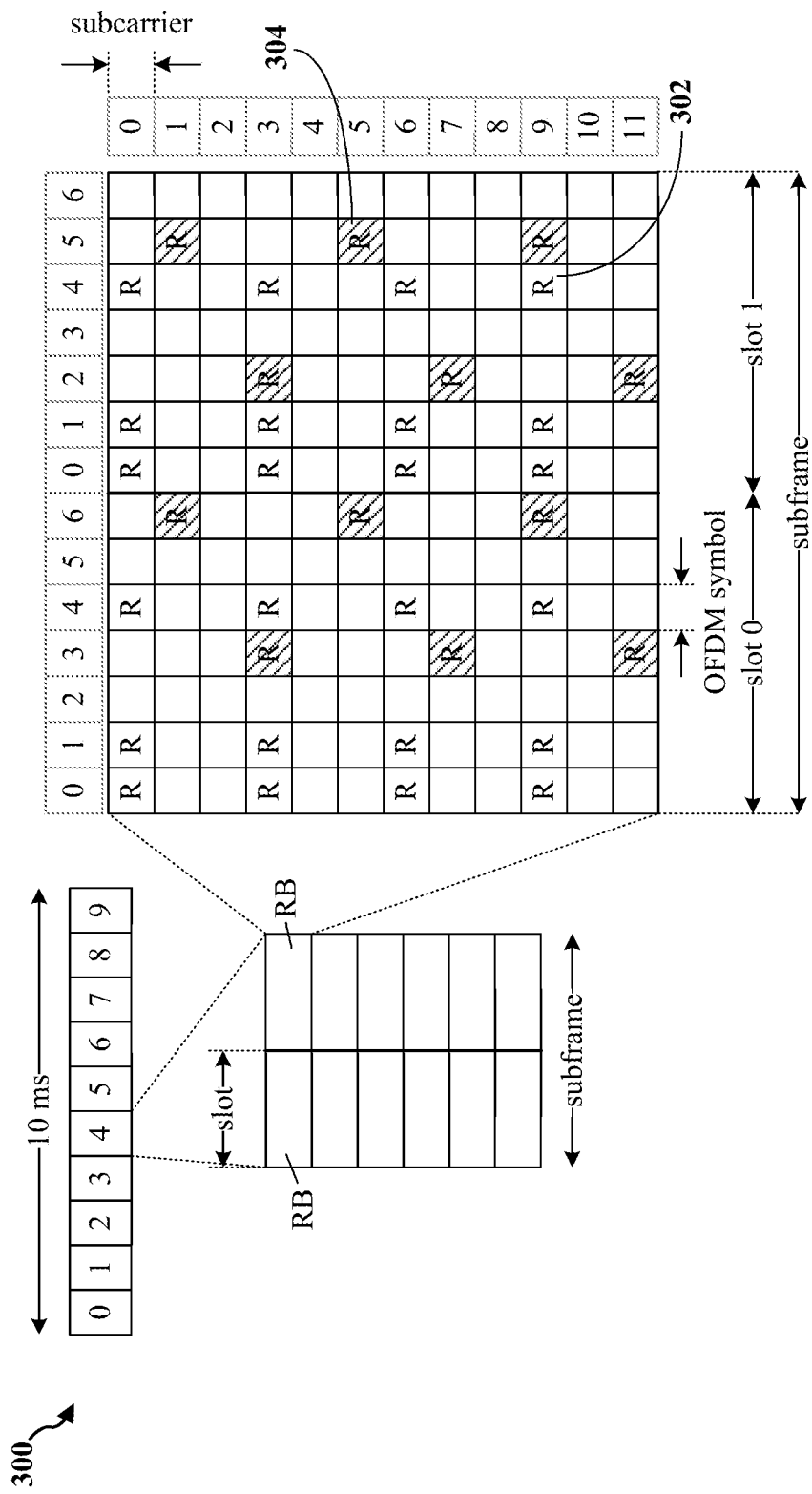
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
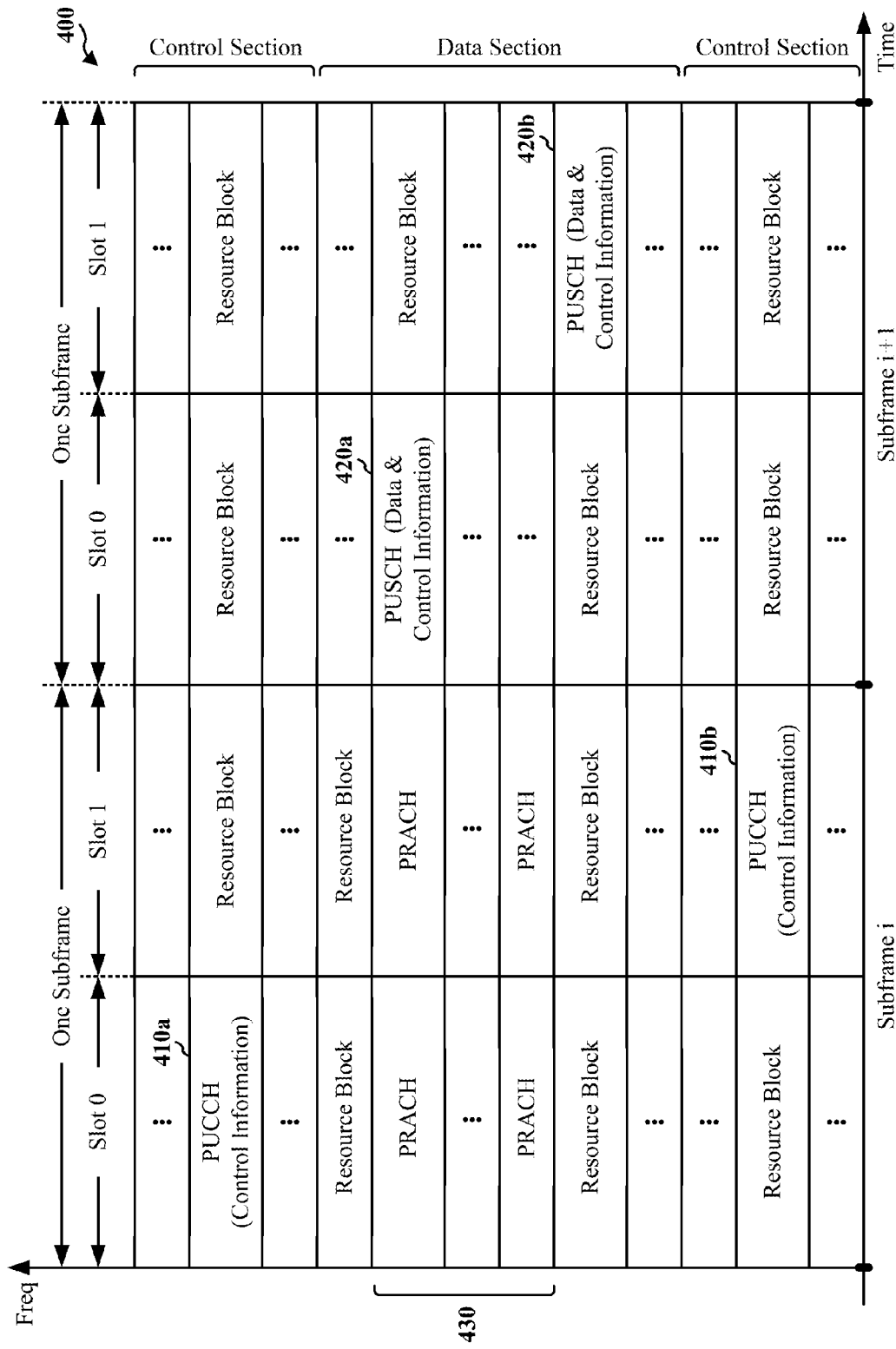
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
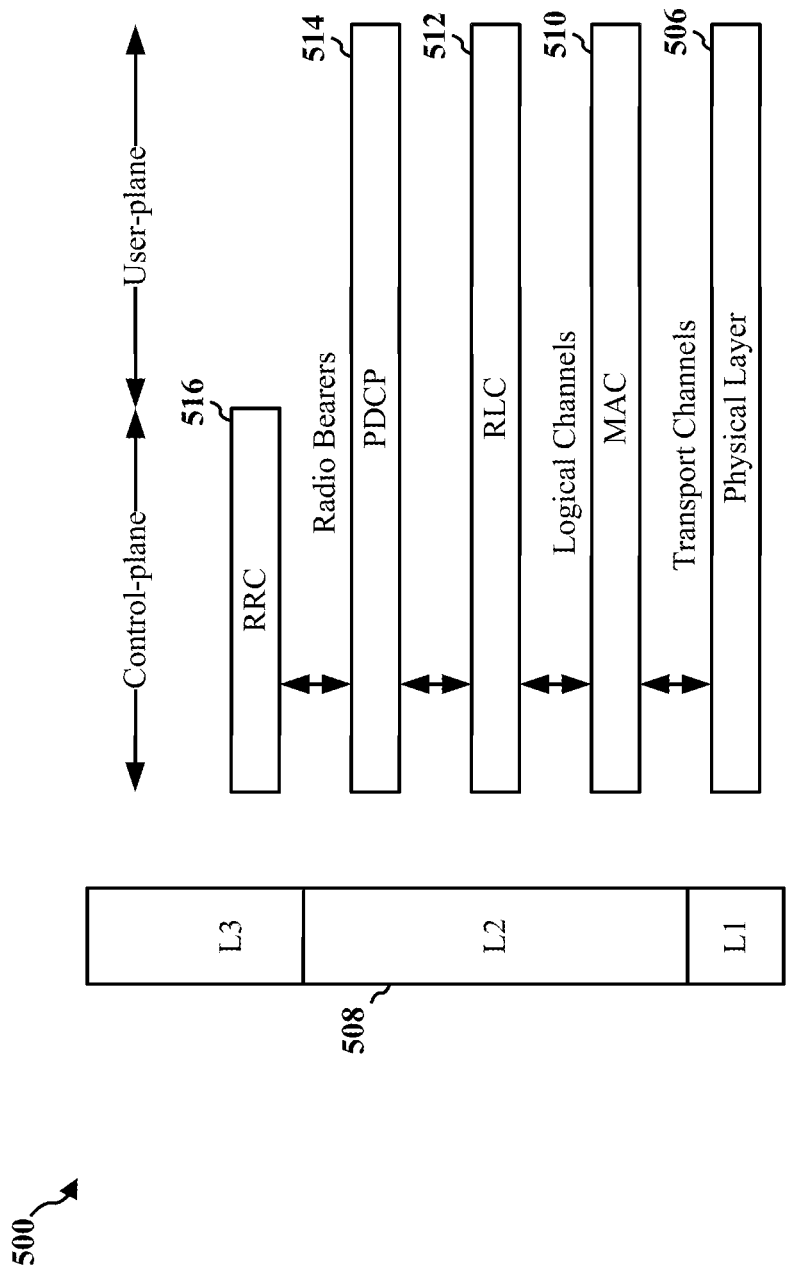
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
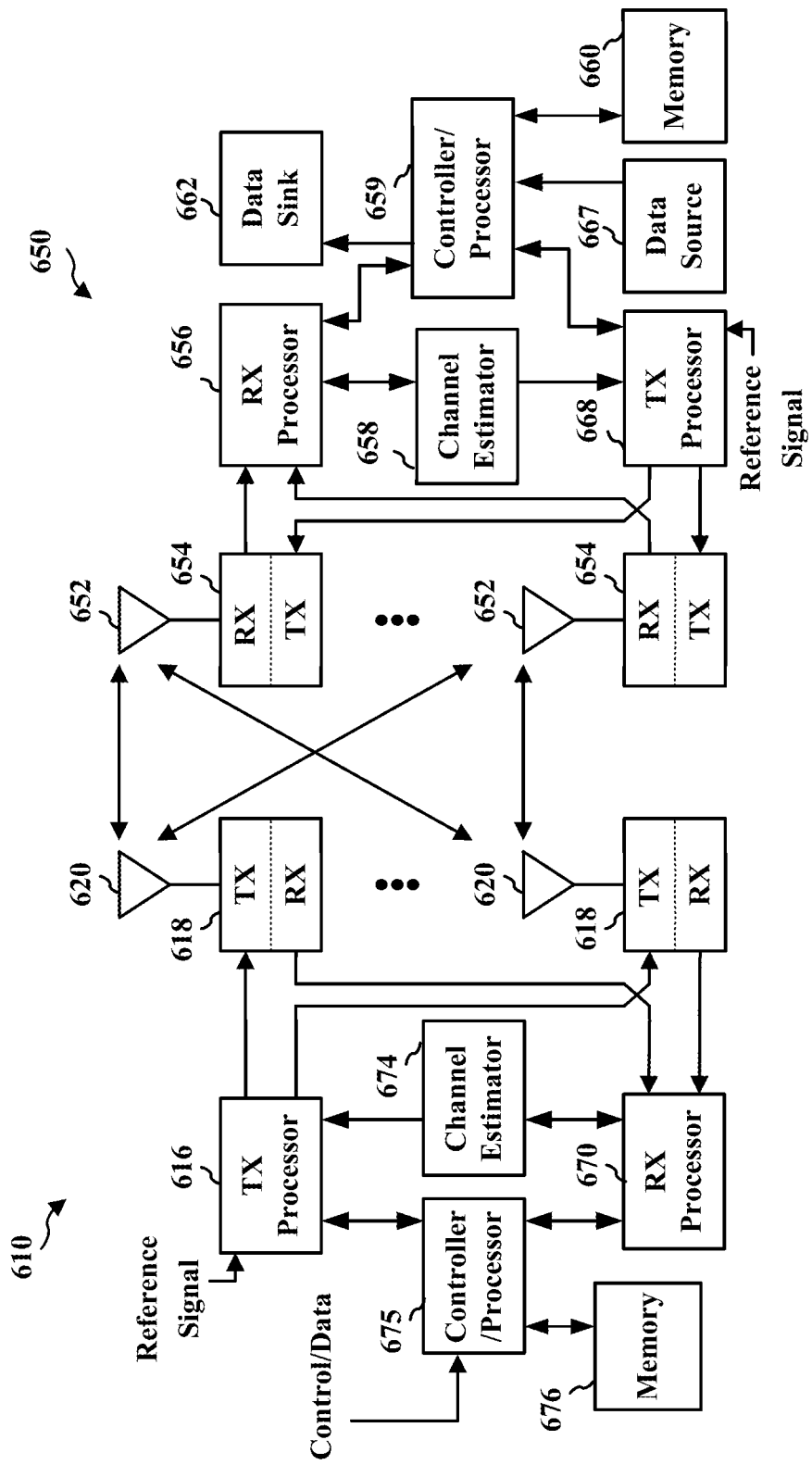
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

A network user device (e.g., a modem) may be used to facilitate a communication service from a server on a cellular network to a client device in a local area network (LAN). The network user device may have a LAN portion and a cellular network portion. The cellular network portion may be connected to the cellular network that facilitates a communication service from a server. The LAN portion may be used to connect to client devices (e.g., laptops, desktops, mobile devices, etc.) to facilitate the communication service from the cellular network to the client devices through the LAN. Accordingly, the network user device provides a connection between the server connected to the cellular network and the client devices on the LAN. The LAN may be based on a wireless local area network (WLAN), Flash-LinQ, WiMedia, Bluetooth, ZigBee, or Wi-Fi based on the IEEE 802.11 standard. In particular, the cellular network provides to the network user device a server IP address of the server (e.g., SIP server IP address or a proxy call session control function (P-CSCF) IP address) that is used to provide a service via the cellular network. Subsequently, the network user device communicates the server IP address to the client devices, to provide the service from the cellular network to the client devices via the server IP address. There may be several different server IP addresses, partly for load balancing and/or as a fail-safe mechanism (e.g., to handoff to another server if one server fails to function).

The client devices may be voice over Internet protocol (VoIP) client devices. The VoIP client devices may be used to make and/or receive calls using a server IP address via a cellular network. In particular, the VoIP client devices generally use a server IP address such as a SIP server IP address or a P-CSCF IP address to register with a server in order to make and receive calls. Initially, the VoIP client devices obtain the IP address of a SIP server or a P-CSCF IP address using several existing mechanisms such as a fully qualified domain name (FQDN) query, dynamic host configuration protocol v4 (DHCPv4) option 120, etc. When a network user device is used to connect to a server via a WWAN, the VoIP client device uses the server IP address to register with the server as the VoIP client device is initially associating with the network user device. The network user device may support a mobile access point (Mobile AP) or Wi-Fi tethering to connect to the server via the WWAN.

Figure 7:
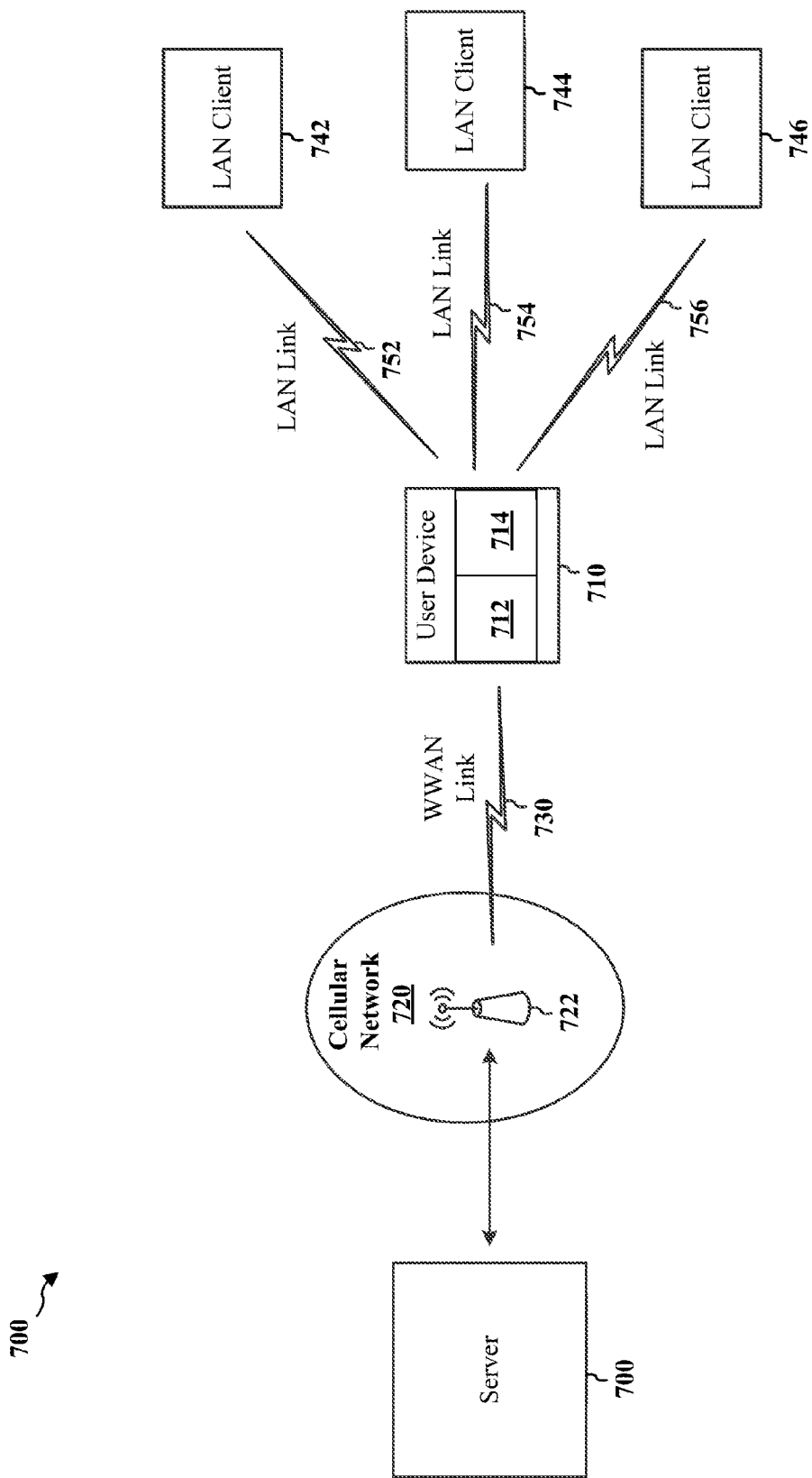
FIG. 7 is an example diagram illustrating a user device connected to two different types of network.

FIG. 7 is an example diagram 700 illustrating a user device connected to two different types of networks. A network user device 710 is a network device configured to connect to a cellular network 720 via a WWAN link 730 and is configured to connect to at least one of the LAN client devices 742, 744, and 746 via LAN links 752, 754, and 756. The cellular network 720 may be served by a base station 722, and is connected to a server 760 that provides a communication service via the cellular network 720. The server 760 may be a SIP server or a P-CSCF server. The network user device 710 may include a cellular network portion 712 and a LAN portion 714. The cellular network portion 712 is connected to the cellular network 720 to facilitate the communication service of the server 760 through the cellular network 720 via the WWAN link 730. The network user device 710 may support software enabled access point (e.g., a mobile access point) or Wi-Fi tethering to connect to the server 760 via the cellular network 720. The LAN portion 714 is used to connect to at least one of the LAN client devices 742, 744, and 746 to facilitate the communication service from the cellular network 704 to at least one of the LAN client devices 742, 744, and 746 via the LAN links 752, 754, and 756. The LAN client devices 742, 744, and 746 use the server IP address of the server 760 to utilize the communication service provided by the server 760, via the network user device 710 and the cellular network 720.

When the network user device is initially activated and the client device starts connecting to the cellular network via the network user device, the server provides a server IP address via the cellular network to the network user device. The network user device relays the server IP address to the client devices such that the client devices may use the server IP address to utilize the service of the server. For example, initially, a server generally provides a list of IP addresses of a SIP server and/or a P-CSCF server in a protocol configuring option (PCO). The network user device may receive the PCO from the cellular network and subsequently relay the PCO to client devices associating with the network user device. Thus, the server IP address may be provided to the client devices via the network user device when the network user device is initially activated and the client device is initially associated with the network user device. A mechanism to communicate a change of one server IP address to another server IP address while the network user device is active is desired. No techniques currently exist to relay server IP address changes to the client devices in the middle of a device-client VoIP session and before a DHCP client lifetime expiry or a DHCP renewal. If there is a change of the server IP address due to various circumstances, such as a hand off on the server side (e.g., for load balancing and/or as a fail-safe mechanism), the change of the server IP address may disrupt the communication between the server connected to the cellular network and the client devices in the LAN. Therefore, a mechanism to adapt to the changes in the server IP addresses to provide seamless communication with the client devices in the LAN is desired.

The disclosure provides an approach that enables the client devices to stay connected to a server on a cellular network in spite of server IP address changes during a session. In order to adapt to the changes in the server IP addresses, the network user device may send information regarding the server IP address changes to the client devices in the LAN, such that the client devices may perform updates based on the server IP address changes and stay connected to the server on the cellular network. In particular, when there are changes in the server IP addresses of the server, the server sends information regarding the server IP address changes to the network user device via the cellular network. Based on the information received from the server, the network user device determines whether there are changes in the server IP address. If there are changes in the server IP address, the network user device sends the information regarding the server IP address changes to the client devices in the LAN. The network user device may use a user datagram protocol (UDP) to send the information regarding the server IP address changes to the client devices. The client devices in the LAN may be connected to the server via the network user device based on the server IP address. The client devices process the information regarding the server IP address changes, and perform updates based on the server IP address changes to stay connected to the server via the network user device. For example, the information regarding the IP address changes may include one or more currently valid server IP addresses and may further include a previous server IP address. Thus, for example, according to the information, the client device may deactivate a connection based on the previous server IP address and establish a connection based on one of the currently valid server IP addresses. At least one of two approaches may be implemented as follows to adapt to the server IP address changes.

A first approach is based on a multicast addressing scheme. According to the first approach, if there are changes in a server IP address while the network user device is active, the network user device receives information regarding changes to the server IP address and communicates the server IP address changes to the LAN client devices via multicast. For example, after the network user device receives information regarding the changes in the server IP address, the network user device may determine that there are changes in the server IP address and communicate the information regarding the server IP address changes to the LAN client devices via multicast. In one example, the network user device may transmit the same multicast packets to the LAN client devices multiple times for redundancy. In such an example, the content of the multicast packets may stay the same as long as the information regarding the server IP address and/or other information stay the same. Subsequently, each LAN client device performs updates based on the information regarding the server IP address changes included in the multicast packets. For example, the network user device may send the multicast packet to respective client devices when the network user device is notified of a server IP address change in the WWAN PCO. Therefore, the client devices may process the information regarding the server IP address changes included in the multicast packets and use the information to update a server IP address and/or re-initiate any VoIP procedures to stay connected to the server's network (e.g., VoIP network). In one example, the client device may perform the update by deactivating an old connection based on a previous server IP address and establish a new connection based on a new server IP address according to the information regarding the server IP address changes.

In one example, the multicast addressing scheme may be implemented for IPv4 and IPv6 (e.g., a 239.255/16 IPv4 address range and a ffx3::/16 IPv6 address local scope). The multicast addressing scheme may utilize 239.255.255.230 for the multicast IP address and Port 4365 for IPv4 clients. The network user device may use a UDP as a transport layer protocol to transfer data (e.g., a multicast packet) containing a list of SIP/P-CSCF server IPv4 addresses and/or SIP/P-CSCF server IPv6 addresses that are currently valid on a wireless carrier VoIP network.

Figure 8B:
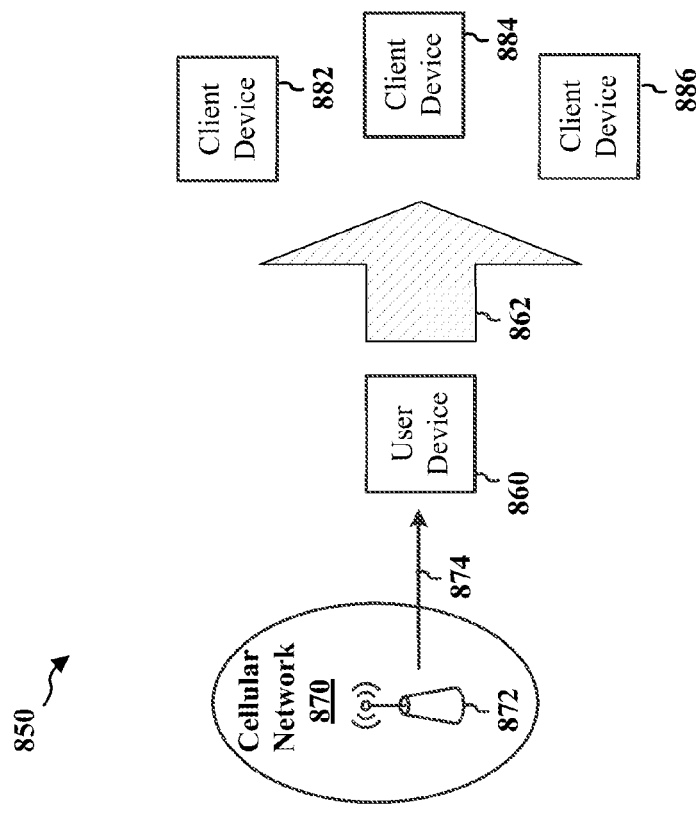
FIG. 8B is an example diagram illustrating a second approach.
Figure 8A:
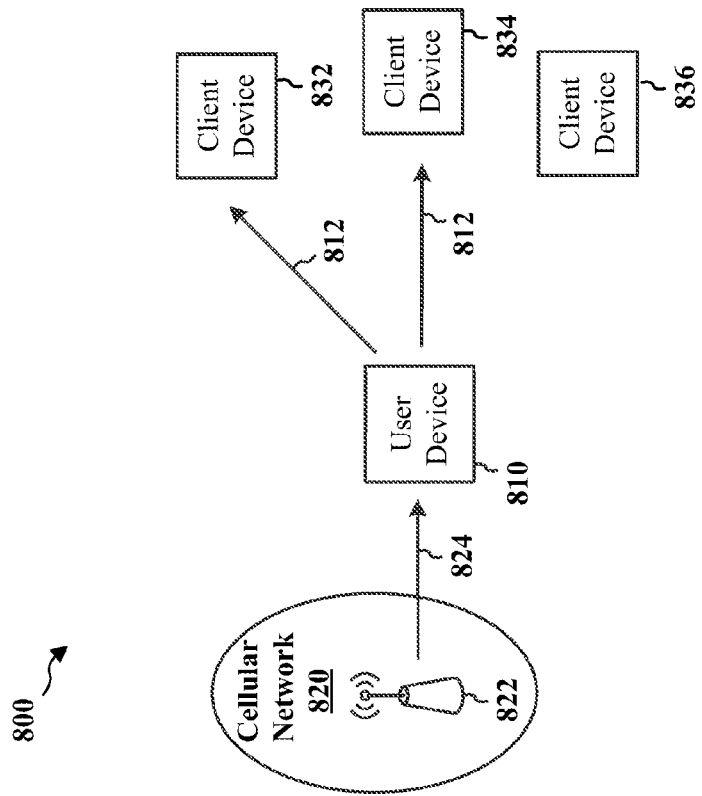
FIG. 8A is an example diagram illustrating a first approach.

FIG. 8A is an example diagram 800 illustrating the first approach. The diagram 800 illustrates that a network user device 810 receives information 824 on changes in an IP address of a server (not shown) from a cellular network 820 served by a base station 822. The network user device 810 sends multicast packets 812 to client devices 832 and 834. In particular, the same multicast packets 812 are sent to the client device 832 and the client device 834. In FIG. 8A, no multicast packet is sent to the client device 836 because the client device 836 is not currently connected to the server via the network user device 810. The multicast packets 812 include information regarding the changes in the server IP address. Subsequently, each of the client devices 832 and 834 uses the information regarding the server IP address changes in the multicast packets 812, and updates the server IP address based on the information regarding the server IP address changes to stay connected with the server with the cellular network 820.

A second approach is based on a broadcast mechanism. According to the second approach, the network user device receives information regarding changes of a server IP address and communicates the server IP address changes to the client devices over broadcast. For example, as the network user device continues to broadcast the information regarding the server IP address changes to the client devices, a client device that is set to use a service of the server may receive the information and perform updates based on the server IP address changes. In one example, the client device may perform the update by deactivating an old connection based on a previous server IP address and establish a new connection based on a new server IP address indicated in the information regarding the server IP address changes.

In an example implementation, the broadcast mechanism may be implemented to use broadcast address 255.255.255.255 for IPv4 and Port 4365. The network user device may use a UDP as a transport layer protocol to transfer the data (e.g., a broadcast packet) containing the list of valid SIP/PC SCF server IP addresses to the client devices. A client device that wishes to use the service may receive the data over broadcast.

FIG. 8B is an example diagram 850 illustrating the second approach. The diagram 850 illustrates a network user device 860 receiving information 874 on changes to an IP address of a server (not shown) from a cellular network 870 served by a base station 872. In FIG. 8B, the client devices 882 and 884 are connected to the server on the cellular network 870 via the network user device 860. The client device 886 is not connected to the server. The network user device 860 sends a broadcast signal 862 including the information regarding the server IP address changes to all client devices 882, 884, and 886. The client devices 882 and 884 that are connected to the server via the network user device 860 receive the broadcast signal 862 and process the information regarding the server IP address changes included in the broadcast signal 862. Subsequently, each of the client devices 882 and 884 uses the information regarding the server IP address changes included in the broadcast signal 862, and updates the server IP address based on the information regarding the server IP address changes to stay connected with the server on the cellular network 870. The client device 886 also receives the broadcast signal 862 although the client device 886 is not currently connected to the server via the network user device 860.

Accordingly, the network user device may be configured to notify the client devices of changes in the server IP address such that the client devices may perform proper updates to stay connected to the server on the cellular network and to avoid disrupting communication with the server connected to the cellular network. For example, because the client devices may perform updates based on the server IP address changes to stay connected with the server on the cellular network, the client devices may avoid missing any incoming VoIP calls and may place outgoing VoIP calls. In another example, although a client TCP/IP stack running on any operating system (OS) is not changed to support multicast/broadcast packet contents, the packet contents may be seamlessly pass to a VoIP application in the client device.

Figure 9:
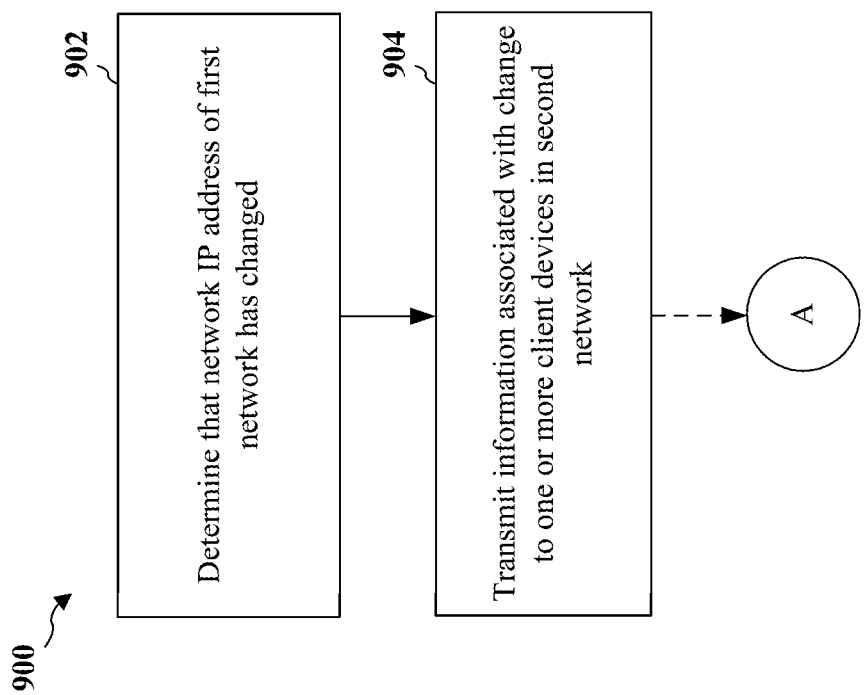
FIG. 9 is a flow chart of a method of wireless communication.

FIG. 9 is a flow chart 900 of a method of wireless communication. The method may be performed by a network user device. At 902, the network user device determines that a network server IP address of a first network has changed. At 904, the network user device transmits information associated with the change to one or more client devices in a second network. In an aspect, the one or more client devices in the second network are connected to the first network using the network server IP address of the first network. In an aspect, the one or more client devices maintain a connection to the first network using the information associated with the change. In an aspect, the one or more client devices in the second network are connected to the first network via the network user device. In an aspect, the first network is a cellular network and the second network is a local area network.

For example, as discussed supra, based on the information regarding the server IP address changes received from the server, the network user device determines that there are changes to the server IP address of the server on the cellular network. As discussed supra, the network user device sends the information regarding the server IP address changes to the client devices in the LAN. As discussed supra, the client devices in the LAN may be connected to the server on the cellular network via the network user device based on the server IP address. For example, as discussed supra, the client devices process the information regarding the server IP address changes, and perform updates based on the server IP address changes to stay connected to the server on the cellular network via the network user device.

In an aspect, a UDP may be used as a transport layer protocol to transmit the information associated with the change to the one or more client devices. In an aspect, the information may contain one or more network server IP addresses that are currently valid in the first network. For example, as discussed supra, the network user device may use a UDP to send the information regarding the server IP address changes to the client devices. For example, as discussed supra, the information regarding the server IP address changes may include one or more currently valid server IP addresses and may further include a previous server IP address.

Figure 10:
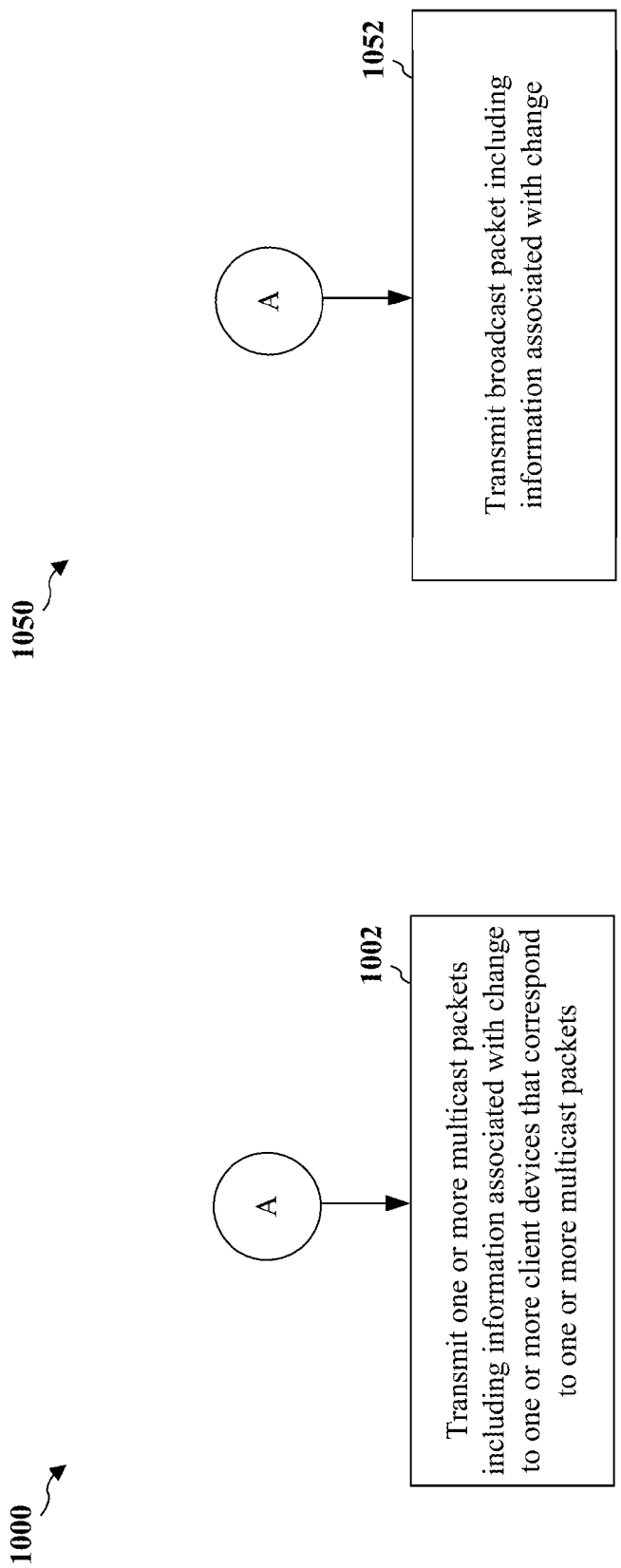
FIG. 10A is a flow chart of a method of wireless communication expanding from FIG. 9 according to the first approach.
FIG. 10B is a flow chart of a method of wireless communication expanding from FIG. 9 according to the second approach.

FIG. 10A is a flow chart 1000 of a method of wireless communication expanding from 904 of FIG. 9 according to the first approach. At 1002, the network user device configured to transmit the information associated with the change may transmit one or more multicast packets including the information associated with the change to the one or more client devices that correspond to the one or more multicast packets. Referring to FIG. 8A, for example, the network user device 810 may send multicast packets 812 to client devices 832 and 834, where the multicast packets 812 include information regarding the changes to the server IP address. In particular, for example, the same multicast packets 812 are sent to the client device 832 and the client device 834.

In an aspect, the one or more multicast packets are transmitted to the one or more client devices based on at least one of IPv4 or IPv6. For example, as discussed supra, a multicast addressing scheme may be implemented for IPv4 and IPv6 (e.g., a 239.255/16 IPv4 address range and a ffx3::/16 IPv6 address local scope).

FIG. 10B is a flow chart 1050 of a method of wireless communication expanding from 904 of FIG. 9 according to the second approach. At 1052, the network user device configured to transmit the information associated with the change may transmit a broadcast packet including the information associated with the change. In an aspect, the one or more client devices in the second network are capable of receiving the broadcast packet. Referring to FIG. 8B, for example, the network user device 860 may send a broadcast signal 862 including the information regarding the server IP address changes to all client devices 882, 884, and 886. As discussed supra, the client devices 882 and 884 that are connected to the server on the cellular network 870 via the network user device 860 may receive the broadcast signal 862 and process the information regarding the server IP address changes included in the broadcast signal 862.

In an aspect, the broadcast packet is transmitted based on IPv4. For example, as discussed supra, the broadcast mechanism may be implemented to use broadcast address 255.255.255.255 for IPv4 and Port 4365.

Figure 11:
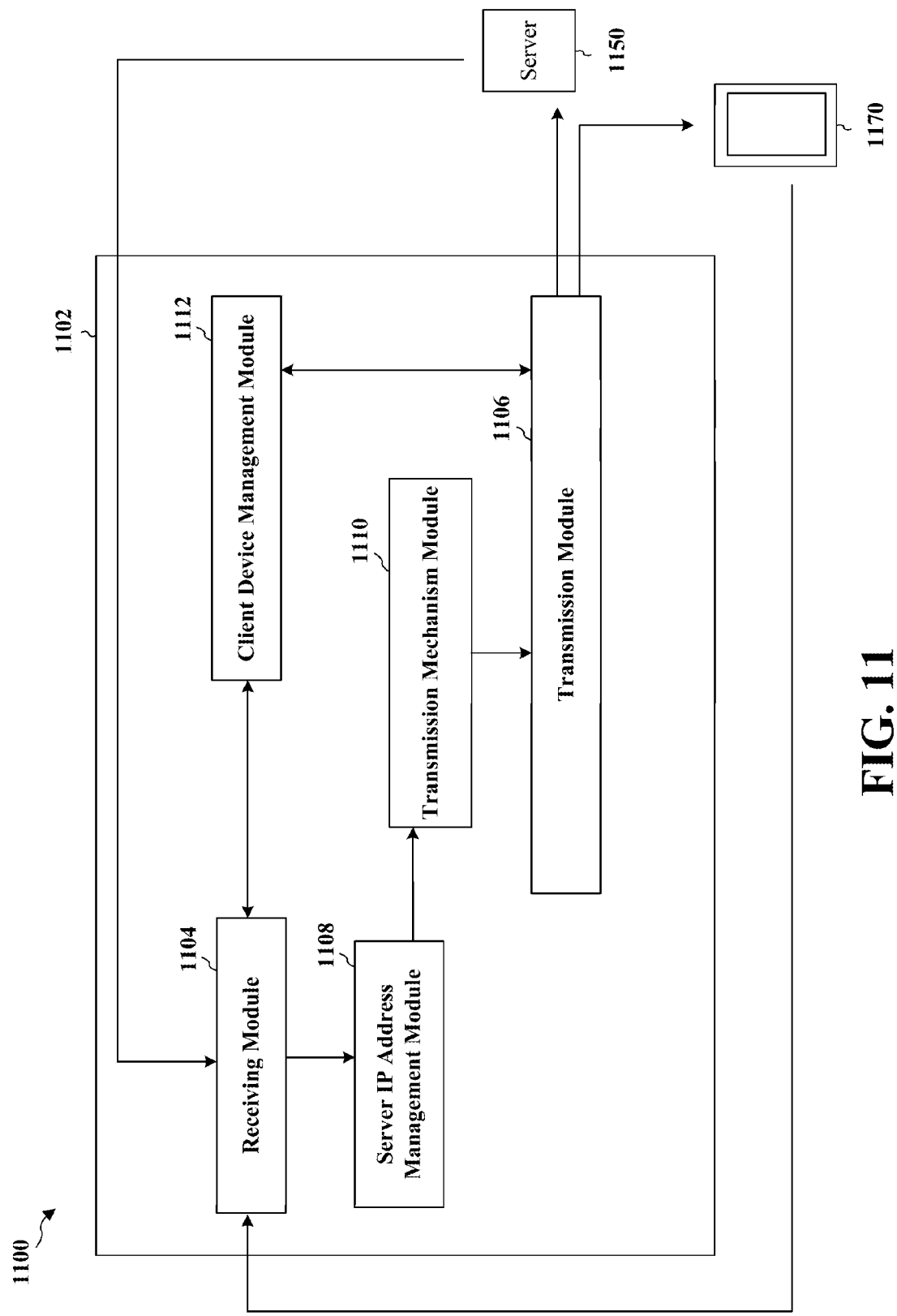
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a network user device. The apparatus 1102 includes a receiving module 1104, a transmission module 1106, a server IP address management module 1108, a transmission mechanism module 1110, and a client device management module 1112. The server IP address management module 1108 determines that a network server IP address of a server 1150 of a first network has changed, based on information received via the receiving module 1104 from the server 1150. The transmission mechanism module 1110 transmits via the transmission module 1106 information associated with the change to one or more client devices 1170 in a second network. In an aspect, the one or more client devices 1170 in the second network are connected to the server 1150 of the first network using the network server IP address of the first network via the apparatus 1102 (e.g., via the client device management module 1112, the receiving module 1104, and the transmission module 1106).

In an aspect, the one or more client devices 1170 may maintain a connection to the first network connected to the server 1150 using the information associated with the change. In an aspect, the one or more client devices 1170 in the second network may be connected to the server 1150 of the first network via the apparatus 1102 (e.g., via the client device management module 1112, the receiving module 1104, and the transmission module 1106). In an aspect, a UDP may be used by the transmission mechanism module 1110 as a transport layer protocol to transmit via the transmission module 1106 the information associated with the change to the one or more client devices 1170. In an aspect, the information may contain one or more network server IP addresses that are currently valid in the first network connected to the server 1150. In an aspect, the first network connected to the server 1150 may be a cellular network and the second network may be a local area network.

According to one approach, the transmission mechanism module 1110 configured to transmit the information may transmit one or more multicast packets including the information associated with the change to the one or more client devices 1170 that correspond to the one or more multicast packets. In an aspect, the multicast packets may be transmitted via the transmission module 1106 to the one or more client devices 1170 based on at least one of IPv4 or IPv6.

According to another approach, the transmission mechanism module 1110 configured to transmit the information may transmit a broadcast packet including the information associated with the change, where the one or more client devices 1170 in the second network are capable of receiving the broadcast packet. In an aspect, the broadcast packet may be transmitted via the transmission module 1106 based on IPv4.

The apparatus may include additional modules that perform each of the steps of the algorithm in the aforementioned flow charts of FIGS. 9, 10A, and 10B. As such, each step in the aforementioned flow charts of FIGS. 9, 10A, and 10B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
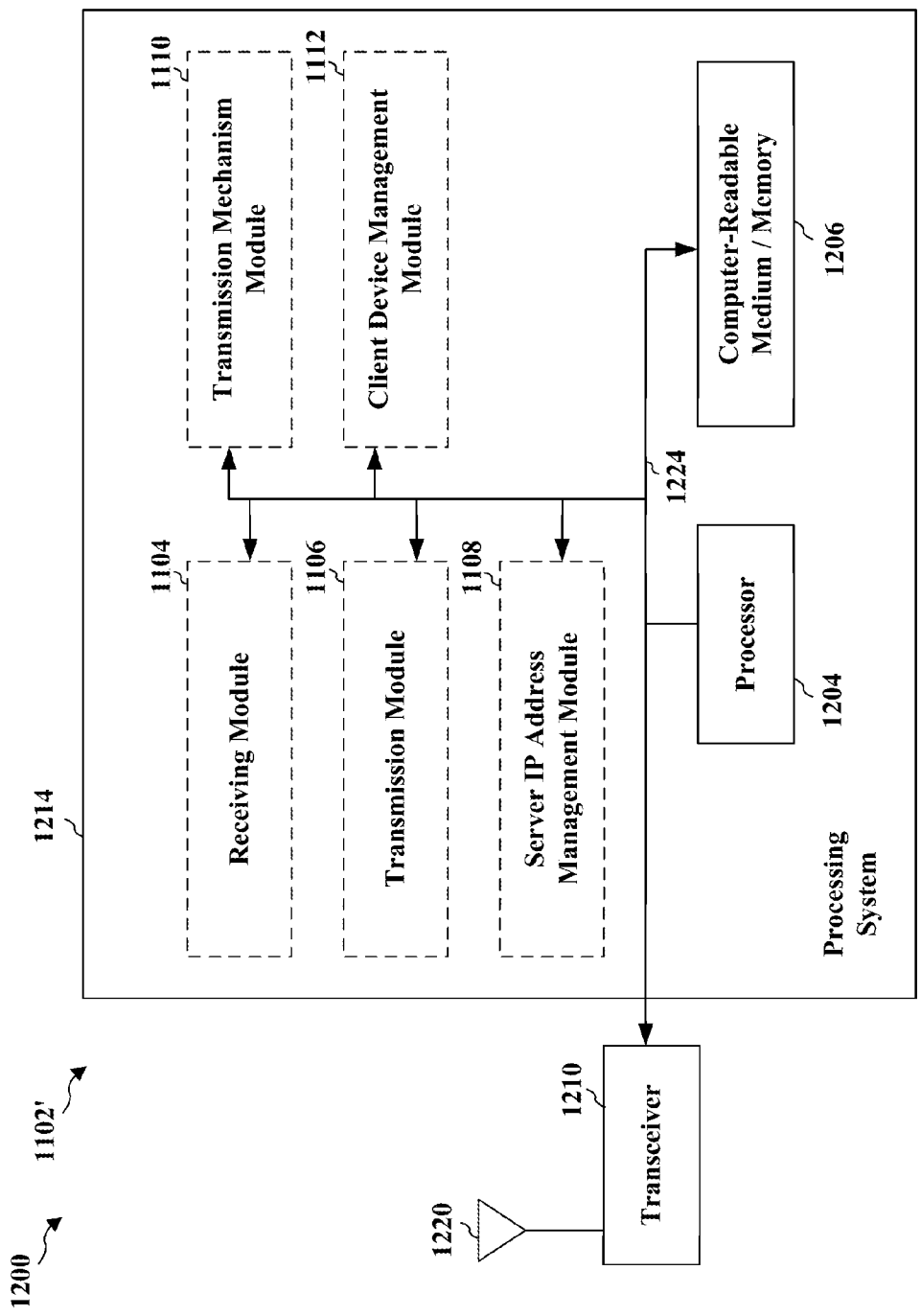
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1106, and based on the received information, generates a signal to be applied to the one or more antennas 1220. The transceiver 1210 and the one or more antennas 1220 may be capable of communicating with two different networks, such as a cellular network (e.g., WWAN) and a local area network (e.g., WLAN). The one or more antennas 1220 may include a first antenna for communicating with the cellular network and a second antenna for communicating with the local area network. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for determining that a network server Internet protocol (IP) address of a first network has changed and means for transmitting information associated with the change to one or more client devices in a second network. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method, by a user device, of wireless communication, comprising:
   determining that a network server Internet protocol (IP) address of a network server, on a cellular network, associated with a voice over IP (VoIP) session has changed by receiving from the network server an indication indicating a change in the network server IP address while the VoIP session is ongoing, wherein the VoIP session is established between the network server and one or more client devices via the user device; and
   transmitting, during the VoIP session and while maintaining a connection with the network server, information indicating the change in the network server IP address of the network server via a local area network to the one or more client devices based on the determination.

2. The method of claim 1, wherein the one or more client devices in the local area network are connected to the cellular network via the user device.

3. The method of claim 1, wherein the transmitting comprises transmitting one or more multicast packets including the information indicating the change to the one or more client devices that correspond to the one or more multicast packets.

4. The method of claim 3, wherein the one or more multicast packets are transmitted to the one or more client devices based on at least one of IPv4 or IPv6.

5. The method of claim 1, wherein the transmitting comprises transmitting a broadcast packet including the information indicating the change, wherein the one or more client devices in the local area network are capable of receiving the broadcast packet.

6. The method of claim 5, wherein the broadcast packet is transmitted based on IPv4.

7. The method of claim 1, wherein a user datagram protocol (UDP) is used as a transport layer protocol to transmit the information indicating the change to the one or more client devices, wherein the information contains one or more network server IP addresses that are currently valid in the cellular network.

8. A user device for wireless communication, comprising:
    means for determining that a network server Internet protocol (IP) address of a network server, on a cellular network, associated with a voice over IP (VoIP) session has changed, the means for determining is configured to receive from the network server an indication indicating a change in the network IP server address while the VoIP session is ongoing, wherein the VoIP session is established between the network server and one or more client devices via the user device; and
    means for transmitting, during the VoIP session and while maintaining a connection with the network server, information indicating the change in the network server IP address of the network server via a local area network to one or more client devices based on the determination.

9. The user device of claim 8, wherein the one or more client devices in the local area network are connected to the cellular network via the user device.

10. The user device of claim 8, wherein the means for transmitting is further configured to transmit one or more multicast packets including the information indicating the change to the one or more client devices that correspond to the one or more multicast packets.

11. The user device of claim 10, wherein the one or more multicast packets are transmitted to the one or more client devices based on at least one of IPv4 or IPv6.

12. The user device of claim 8, wherein the means for transmitting is further configured to transmit a broadcast packet including the information indicating the change, wherein the one or more client devices in the local area network are capable of receiving the broadcast packet.

13. The user device of claim 12, wherein the broadcast packet is transmitted based on IPv4.

14. The user device of claim 8, wherein a user datagram protocol (UDP) is used as a transport layer protocol to transmit the information indicating the change to the one or more client devices, wherein the information contains one or more network server IP addresses that are currently valid in the cellular network.

15. A user device for wireless communication, comprising:
    a memory; and
    at least one processor coupled to the memory and configured to:
        determine that a network server Internet protocol (IP) address of a network server, on a cellular network, associated with a voice over IP (VoIP) session has changed, the at least one processor being configured to determine by receiving from the network server an indication indicating a change in the network server IP address while the VoIP session is ongoing, wherein the VoIP session is established between the network server and one or more client devices via the user device; and
        transmit, during the VoIP session and while maintaining a connection with the network server, information indicating the change in the network server IP address of the network server via a local area network to the one or more client devices based on the determination.

16. The user device of claim 15, wherein the one or more client devices in the local area network are connected to the cellular network via the user device.

17. The user device of claim 15, wherein the at least one processor configured to transmit is further configured to transmit transmitting one or more multicast packets including the information indicating the change to the one or more client devices that correspond to the one or more multicast packets.

18. The user device of claim 17, wherein the one or more multicast packets are transmitted to the one or more client devices based on at least one of IPv4 or IPv6.

19. The user device of claim 15, wherein the at least one processor configured to transmit is further configured to transmit a broadcast packet including the information indicating the change, wherein the one or more client devices in the local area network are capable of receiving the broadcast packet.

20. The user device of claim 19, wherein the broadcast packet is transmitted based on IPv4.

21. The user device of claim 15, wherein a user datagram protocol (UDP) is used as a transport layer protocol to transmit the information indicating the change to the one or more client devices, wherein the information contains one or more network server IP addresses that are currently valid in the cellular network.

22. A non-transitory computer-readable medium of a user device storing computer executable code for device control, comprising code for:
    determining that a network server Internet protocol (IP) address of a network server, on a cellular network, associated with a voice over IP (VoIP) session has changed, the code for determining further comprises code for receiving from the network server an indication indicating a change in the network server IP address while the VoIP session is ongoing, wherein the VoIP session is established between the network server and one or more client devices via the user device; and
    transmitting, during the VoIP session and while maintaining a connection with the network server, information indicating the change in the network server IP address of the network server via a local area network to the one or more client devices based on the determination.

23. The non-transitory computer-readable medium of claim 22, wherein the transmitting comprises transmitting one or more multicast packets including the information indicating the change to the one or more client devices that correspond to the one or more multicast packets.

24. The non-transitory computer-readable medium of claim 22, wherein the transmitting comprises transmitting a broadcast packet including the information indicating the change, wherein the one or more client devices in the local area network are capable of receiving the broadcast packet.

25. The method of claim 1, wherein the information, comprising one or more valid IP addresses associated with the network server and a previous network server IP address previously associated with the network server for the VoIP session, is transmitted before a dynamic host configuration protocol (DHCP) lifetime associated with the VoIP session between the network server and the one or more client devices expires.

\* \* \* \* \*